United States Patent [19]

Zanotti et al.

[11] 4,006,973
[45] Feb. 8, 1977

[54] LASER MIRROR COOLANT PRESSURE BALANCE MEANS WITH SEPARATE INLET AND OUTLET MANIFOLDS

[75] Inventors: Arthur L. Zanotti; Robert K. Stalcup, both of Lake Park, Fla.

[73] Assignee: United Technologies Corporation, Hartford, Conn.

[22] Filed: May 12, 1975

[21] Appl. No.: 576,493

[52] U.S. Cl. .............................. 350/310; 350/288
[51] Int. Cl.² .......................................... G02B 5/08
[58] Field of Search ............ 350/310, 288; 126/271

[56] References Cited

UNITED STATES PATENTS

| | | | |
|---|---|---|---|
| 1,530,441 | 3/1925 | Thomson | 350/310 |
| 3,854,800 | 12/1974 | Dye et al. | 350/310 |

*Primary Examiner*—John K. Corbin
*Assistant Examiner*—Jon W. Henry
*Attorney, Agent, or Firm*—Jack N. McCarthy

[57] ABSTRACT

A cooled laser mirror assembly and mounting structure wherein a laser mirror is mounted in a housing with a coolant flow transfer tube located in two places around the periphery of the laser mirror, one flow transfer tube assembly being for coolant flow into said mirror assembly while the other transfer tube assembly is for directing a fluid flow from said laser mirror assembly. These transfer tube assemblies provide for a coolant flow into and out of the mirror without providing a direct or coolant pressure loading into the mirror. Passage means connects the inner end of the coolant flow transfer tube to passages adjacent the reflecting surface of the mirror. This pressure balance means directs the coolant flow into parallel passages adjacent the reflecting surface of the mirror in the same direction.

1 Claim, 4 Drawing Figures

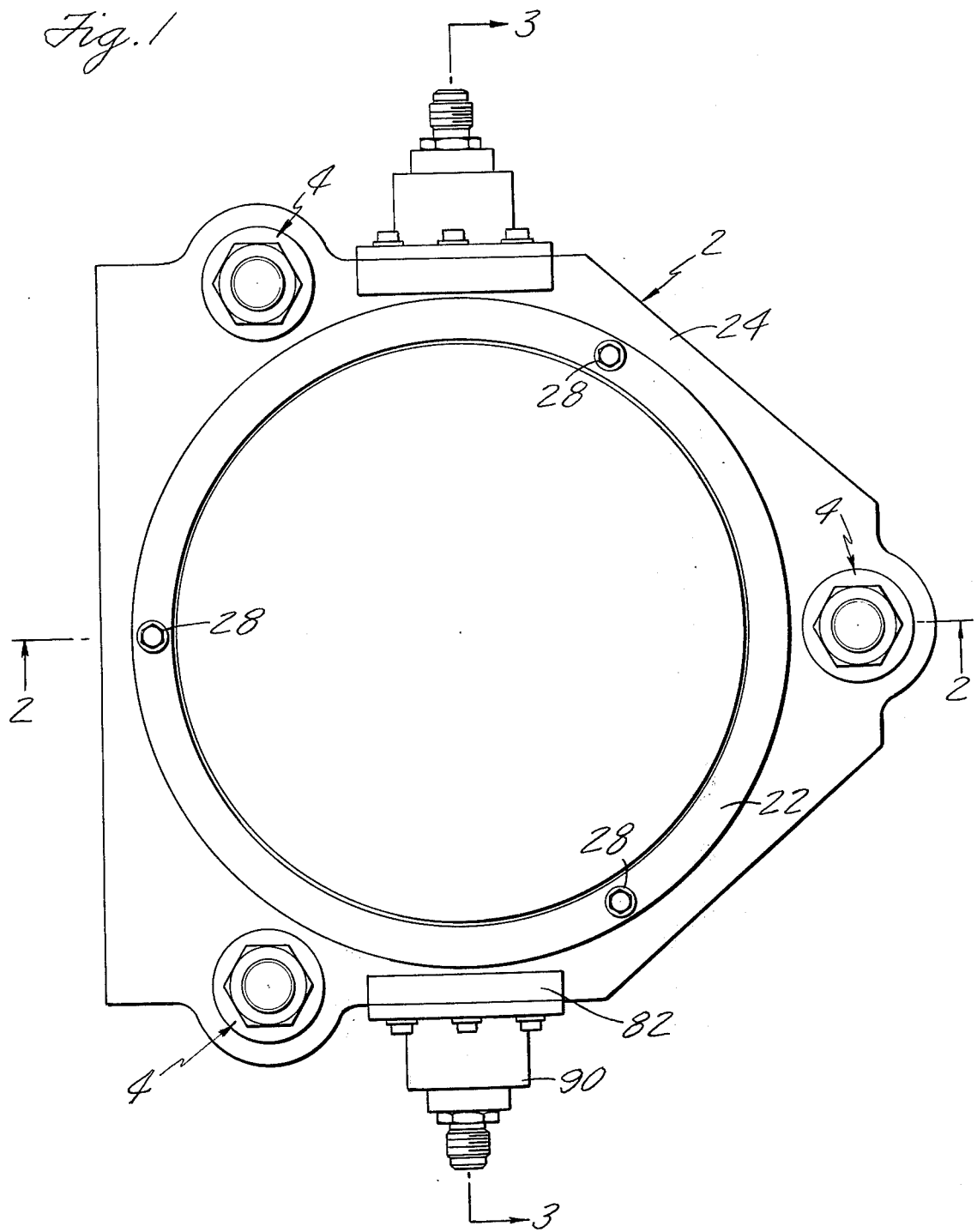

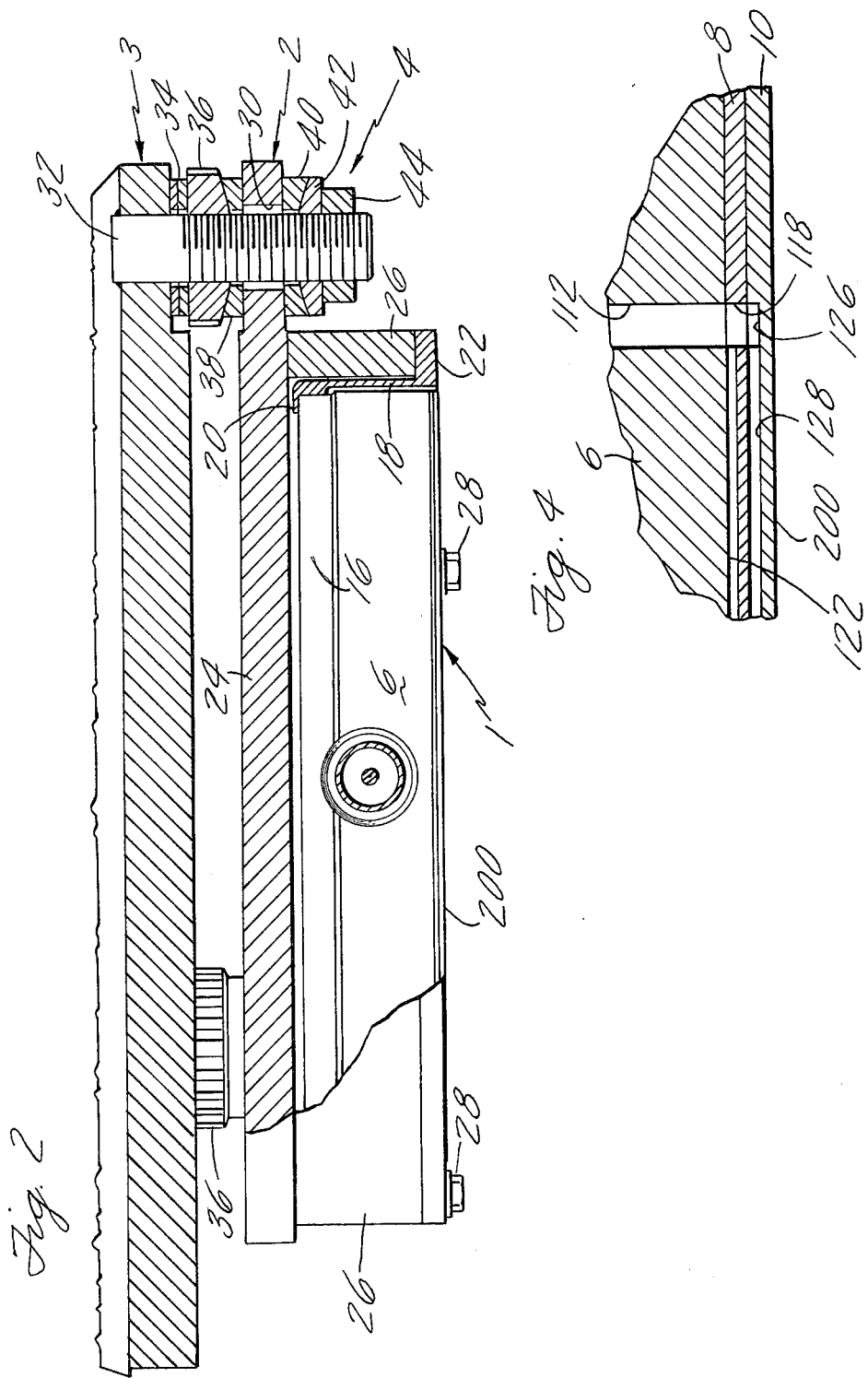

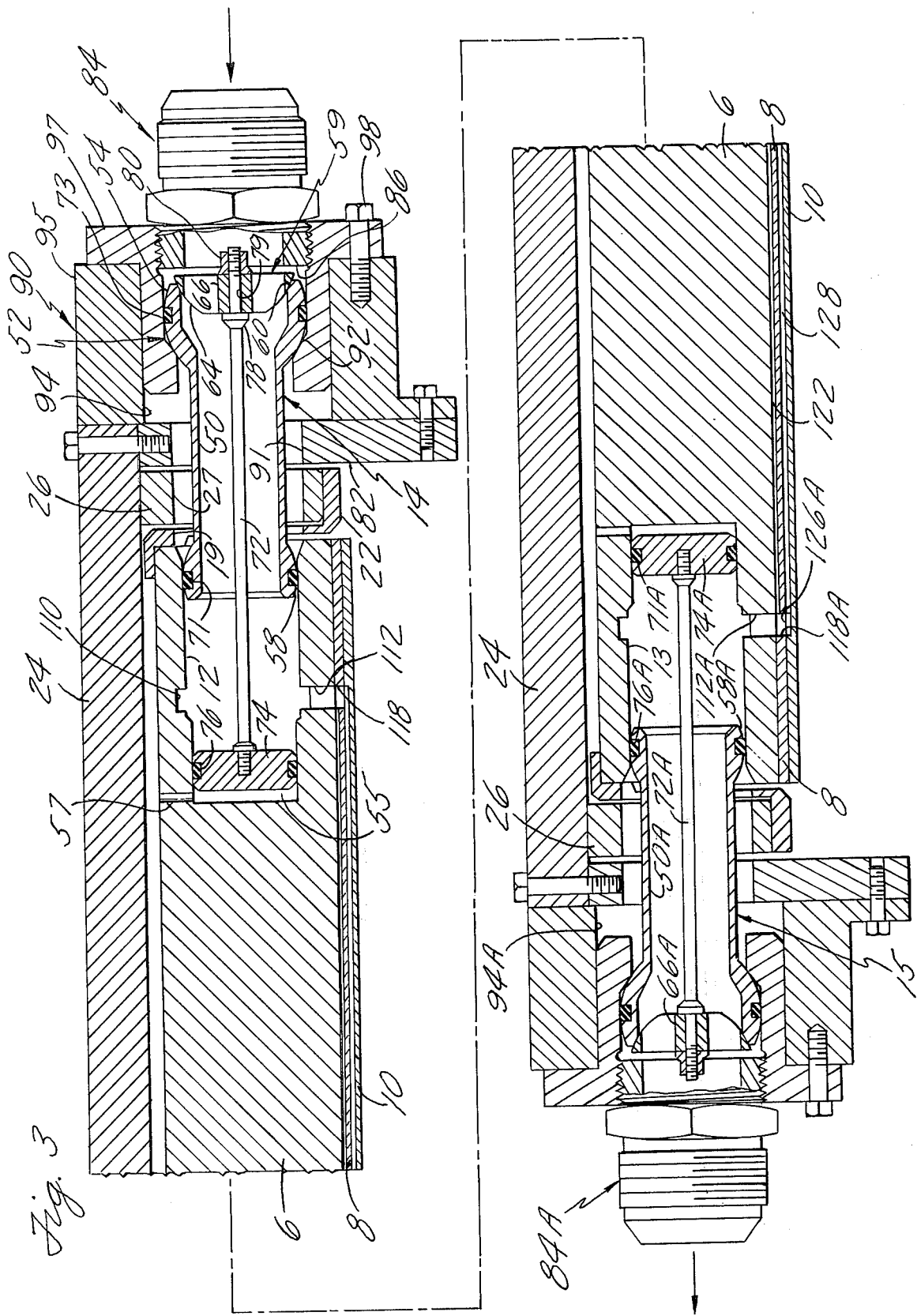

4,006,973

LASER MIRROR COOLANT PRESSURE BALANCE MEANS WITH SEPARATE INLET AND OUTLET MANIFOLDS

BACKGROUND OF THE INVENTION

Two patents showing prior art ways of directing a cooland fluid into a laser mirror are shown in U.S. Pat. No. 3,637,296 and U.S. Pat. No. 3,854,799.

SUMMARY OF THE INVENTION

The primary object of the present invention is to transfer a coolant fluid from its source by separate inlet and outlet manifold systems through a mirror assembly and out without introducing and load into the mirror.

In accordance with the present invention, a mirror assembly is formed so that a coolant fluid is directed into the mirror by an inlet flow transfer tube assembly and out of the mirror by an outlet flow transfer tube assembly without introducing a fluid pressure load into the mirror.

Further, in accordance with the present invention a flow transfer tube assembly is provided having an outer tube and an inner rod extending through the tube with a cylindrical member at one end and a cap member at the other which has a seating engagement with the cooperating end of the tube. Both tube and rod provided having a small axial movement to reduce the possibility of having any direct load being passed therethrough into the mirror.

BRIEF DESCRIPTION OF THE DRAWINGS

FIG. 1 is a front view of a laser mirror assembly and housing installation.

FIG. 2 is a view taken substantially along the line 2—2 of FIG. 1 showing the structure on which the laser mirror assembly and its housing is mounted.

FIG. 3 is an enlarged view taken along the line 3—3 of FIG. 1 showing the transfer tube assemblies connected between the mirror assembly and housing.

FIG. 4 is an enlarged fragmentary sectional view of the backing plate and two cover plates of the mirror assembly.

DESCRIPTION OF THE PREFERRED EMBODIMENT

The laser mirror assembly 1 is mounted on a housing means 2 which is in turn fixedly positioned to a fixed structure 3 by three adjustable mounting bolt assemblies 4.

The laser mirror assembly 1 comprises a backing member 6 with two cover plates 8 and 10 mounted thereon. A similar reflecting device is shown in U.S. Pat. No. 3,637,296, referred to above. Two cylindrical openings 12 and 13 are located extending radially inwardly from approximately the center of the periphery of the backing plate 6 at two diametrically opposed locations through which coolant flow is directed towards and away from the mirror assembly by the transfer tube assemblies 14 and 15, respectively.

The backing member 6 of the laser mirror assembly 1 is circular and has a reduced section 16 at its inner end which has a press fit in the bottom part of a cylindrical mounting member 18. The bottom of the backing member 6 rests against an inwardly extending annular flange 20. The cylindrical mounting member 18 extends to a point adjacent the two cover plates 8 and 10 and has an outwardly extending flange 22 extending therearound. Except for the press fit, the cylindrical mounting member 18 is spaced from the remainder of the laser mirror assembly.

The housing means 2 includes a mounting plate 24 with a cylindrical housing ring 26 fixed to and extending therefrom. The mousing ring 26 can be fixed to the mounting plate 24 by any means desired. The housing ring 26 extends outwardly from the mounting plate 24 a sufficient distance so that the laser mirror assembly 1 can be mounted therein with the surface of the outwardly extending flange 22 engaging the circumferential surface of the housing ring 26, leaving the bottom of the laser mirror assembly 1 spaced from the mounting plate 24 and the outer surface of the cylindrical member 18 spaced from the housing ring 26. A plurality of bolts 28 extend through the flange 22 into the housing ring 26 to fixedly position the laser mirror assembly therewith.

Mounting plate 24 is contoured so as to have three mounting holes 30 thereon located 120° apart for fixing the housing means 2 to the fixed structure 3. This is done in each case by an adjustable mounting bolt assembly 4. Each adjustable mounting bolt assembly 4 comprises a bolt 32 which extends outwardly from the fixed structure 3 to extend through a mounting hole 30. A plurality of shims 34 are located around each bolt 32 adjacent the fixed structure 3 while a nut 36 is positioned thereon to provide a spherical surface at a desired position facing the mounting plate 24. A washer 38 is mounted between the nut 36 and the mounting plate 24 with a mating spherical seat engaging said spherical surface.

A washer 40, similar to washer 38, is mounted on the opposite side of mounting plate 24 with its spherical seal facing outwardly, a nut 42, similar to nut 36, is threadably mounted on the bolt 32 with a spherical surface engaging the spherical seat of washer 40. A lockout 44 is placed over the bolt 32 to hold the mounting bolt assembly 4 in place. It can be seen that this mounting construction permits a mounting tolerance between the bolts 32 and the holes 30 in the mounting plate 24.

Since the transfer tube assemblies 14 and 15 are the same, only assembly 14 will be described in detail. Where similar parts are referred to for assembly 15, the letter A will be added to the reference numeral of assembly 14. A laser mirror coolant pressure balance means having a single transfer tube is shown in U.S. Application Ser. No. 576,492 filed herewith. The transfer tube assembly 14, which directs the coolant flow towards the mirror assembly, has one end sealably engaging the interior of the cylindrical opening 12 while the other end has an enlarged head portion which is mounted in the housing means 2 in a manner to be hereinafter described. An opening 27 is provided in the housing ring 26 and an opening 19 is provided in the cylindrical mounting member 18 which are larger than, and aligned with, the cylindrical opening 12 in the backing plate 6, through which one end of the transfer tube assembly 14 passes.

The transfer tube assembly 14 comprises an outer tubular member 50 with an enlarged head 52 at one end thereof, the enlarged head being formed having an outer spherical surface 54 with a small conical seat 60 at its free end. Said spherical surface 54 having a groove therearound containing a seal member 73. The other end of the outer tubular member 50 is slightly enlarged to form an outer spherical surface 58, said spherical surface 58 having a groove therearound containing a seal member 71 contacting the inner surface of the cylindrical opening 12.

An inner rod member 72 is located in the tubular member 50 with one end being threaded and having a cylindrical member 74 threadably mounted thereon with a diameter such that the cylindrical member has its periphery adjacent the inner surface of the cylindrical opening 12. Cylindrical member 74 has a groove therearound containing a seal member 76 contacting the inner surface of the cylindrical opening 12. The other end of the rod 72 is threaded and has a small flange 78 extending outwardly therefrom. The threaded portion of the rod 72 extends through an opening 79 in the center of a cap member 59 and is fixed thereto by a nut 80 with the flange 78 against the inner side of the cap member 59. The cap member 59 is constructed having a spherical surface 64 for engaging the conical seat 60 on the end of the tubular member 50. A plurality of holes 66 are placed around the cap member 59 to allow a fluid to pass through the cap.

This construction of a transfer tube assembly permits a floating movement of the rod 72, and its cylindrical member 74 and cap member 59, with respect to the tubular member 50. The space 55 located between the free face of cylindrical member 74 and the end of opening 12 is vented by a passage 57 to the back of the backing member 6.

The enlarged head portion of the transfer tube assembly 14 is mounted in a manifold housing means 90 which is fixed to a manifold plate 82, which extends outwardly from the mounting plate 24. The manifold plate 82 extends from mounting plate 24 adjacent the opening 27 on the cylindrical housing ring 26 and an opening 91 is positioned therein of a size large enough to permit the cylindrical member 74 and the free end of tubular member 50 to pass therethrough and extend into the opening 27.

The manifold housing means 90 comprises an outer member 95 having a large opening 94 extending through to the manifold plate 82 with an adapter 97 fixed to the member 95 and extending into the recess 94. The adapter 97 is shown fixed by bolts 98. The adapter 97 has an opening therethrough comprising two sections having two different sized diameters with an outwardly facing seat 92 being formed between them. The enlarged head 52 is positioned in the section of the larger diameter with its spherical surface 54 facing the seat 92.

A fitting adapter 84 is threadably mounted in the outwardly facing end of the larger diameter section of the opening of adapter 97 to permit an inlet conduit to be connected thereto and direct coolant into the larger sized section. The inner end of the fitting adapter 84 is positioned so that the distance between the seat 92 and the inner surface 86 of the fitting adapter 84 permits a small axial movement of the enlarged head 52, and/or the cap member 59. As can be seen, it is possible for the tubular member 50 and rod 72 to move separately or together, along with the associated parts. This movement permits small angular movements of the tubular member 50 and rod 72 so that no load is placed upon the backing member 6 of the mirror assembly 1. However, when the coolant is flowing through the mirror, the parts are positioned as shown in FIG. 3.

An inlet manifold 110 is formed in the backing plate 6 in the cylindrical opening 12 at a location between the cylindrical member 74 and the end of tubular member 50. A passageway 112 connects the inlet manifold 110 to the forward face of the backing plate where the cover plates 8 and 10 are mounted thereon. The cover plate 8 adjacent the forward face of the backing plate has an arcuate slot 118 located on one side thereof with a similar arcuate slot 118A being located on the opposite side thereof. The arcuate slots 118 and 118A are spaced apart to cover the desired area of the cover plate 10 on which a reflecting surface 200 is located. A plurality of grooves 122 connect the arcuate slot 118 to the arcuate slot 118A. The arcuate groove 118 is positioned so as to interact with the opening of the passageway 112 on the forward face of the backing plate. The cover plate 10 has an arcuate groove 126 positioned thereon to cooperate with the arcuate slot 118 on the cover plate 8. An arcuate groove 126A is located on the opposite side of the cover plate 10 and is positioned to cooperate with the arcuate slot 118A of the cover plate 8. A plurality of grooves 128 connect the arcuate groove 126 to the arcuate slot 126A. The arcuate slot 118A is positioned so as to interact with the opening of the passageway 112A on the forward face of the backing plate. Prior art U.S. Pat. No. 3,854,799 shows a reflecting device construction having cover plates fixed to a backing member.

OPERATION

During the requirements for coolant fluid in the laser mirror assembly, the coolant is delivered through a fitting adapter 84 into the opening in the adapter 97 where it passes through holes 66 to the interior of the tubular member 50. The fluid then passes to the inlet manifold 110 in the cylindrical opening 12 where it flows through passageway 112 to the arcuate slot 118 of cover plate 8 and arcuate groove 126 of cover plate 10. The flow then continues down the grooves 122 and 128 to the arcuate slot 118A and arcuate groove 126A where it is directed into the passageway 112A. The flow enters into the cylindrical opening 13 where it passes into the interior of the tubular member 50A. The coolant within tubular member 50A passes through the openings 66A to the outlet opening in fitting adapter 84A. The coolant in the cylindrical opening 12 imposes a pressure load on cylindrical member 74 which is carried through rod 72, cap member 59, tubular member 50, adapter 97 and manifold housing means 90 to the mounting plate 24 and manifold plate 82, causing pressure to be transferred to fixed structure 3 through mounting bolt assemblies 4, thereby minimizing any hydraulic load on mirror assembly.

We claim:

1. In combination, a mirror, means for mounting said mirror, said mirror containing coolant passages, said mirror having a first opening therein and a second opening therein, said first opening being connected to one end of said coolant passages and said second opening being connected to the other end of said coolant passages, first means for directing a coolant fluid to said coolant passages including a first transfer tube assembly, second means for directing a coolant fluid from said coolant passages including a second transfer tube assembly, said first transfer tube assembly having one end positioned in said first opening, said second transfer tube assembly having one end positioned in said second opening, a first manifold means fixed with respect to said mounting means, a second manifold means fixed with respect to said mounting means, the other end of said first transfer tube assembly being connected to said first manifold means, the other end of said second transfer tube assembly being connected to said second manifold means, each transfer tube assembly comprises a tubular member, each tubular member having an enlarged head on each end, each head having a spherical surface thereon, each spherical surface on one end extending into its cooperating opening in said mirror, the spherical surface on the other end of each tubular member being connected to its manifold means to limit its movements into its cooperating opening, each enlarged head being connected to its manifold means by being confined between an inner seat and an outer stop means in its manifold means, the end of each tubular member connected to its manifold means having a seat in the end thereof, a rod member positioned in each tubular member, each rod member having a cylindrical member fixed on one end contacting its cooperating opening in said mirror and a cap member fixed on the other end, each cap member having a spherical surface for engaging its seat in the end of its tubular member for limiting the movement of its cylindrical member so that it does not contact the bottom of its cooperating opening, each cap member being retained between the end of its tubular member and its outer stop means, each cap member having opening means therethrough for the flow of a coolant, said first manifold means includes a first outer member fixed to said mounting means aligned with said first opening, said second manifold means includes a second outer member fixed to said mounting means aligned with said second opening, each outer member having an insert fixed therein and an adapter connected to said insert, each insert having an inner seat, each adapter forming an outer stop means for its cap member, each adapter having an opening therein to provide a passage connected to the cap member.

* * * * *